Patented Nov. 17, 1931

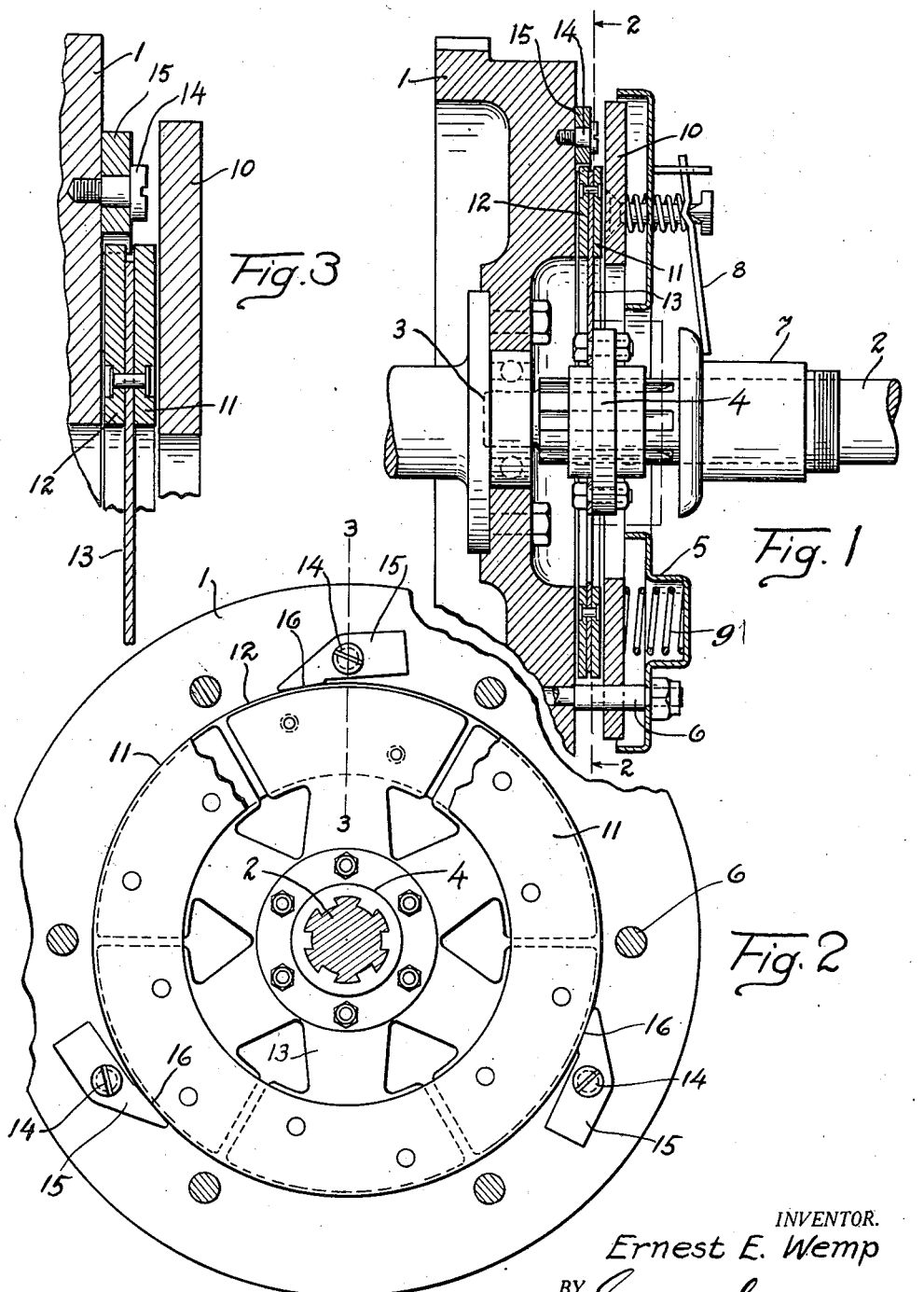

1,832,073

UNITED STATES PATENT OFFICE

ERNEST E. WEMP, OF DETROIT, MICHIGAN

GEAR SYNCHRONIZER ASSISTANT FOR CLUTCHES

Application filed October 24, 1928. Serial No. 314,571.

This invention relates to a gear synchronizer assistant for a clutch in an automotive vehicle for the purpose of facilitating shifting of gears.

The invention more particularly contemplates an automatic drag coupling member which is mounted on the driving clutch member and which operates directly upon the clutch facing material of the driven member to effect a drag coupling relation between the driving clutch member and the driven member.

In the drawings:

Fig. 1 is a vertical section through the clutch showing the relation between the drag coupling member and the driving and driven members.

Fig. 2 is a section on the line 2—2 of Fig. 1.

Fig. 3 is a detail section on the line 3—3 of Fig. 2.

In the drawings, 1 denotes the flywheel of the engine, and 2 the driven shaft which is journalled into the flywheel as at 3. The driven hub 4 may be splined onto the driven shaft. The clutch cover plate 5 is connected to the flywheel 1 by means of bolts 6. The clutch is released by an outward movement of the shift collar 7 which causes the levers 8 to act against the springs 9, thereby causing the driving disc 10 and flywheel 1 to be disengaged respectively from the clutch linings 11 and 12 which face the driven clutch member 13. It will be noted that the clutch facings 11 and 12 extend beyond the outer periphery of the web portion of the driven member 13 as clearly shown in the drawings.

Pivotally mounted off center on the face of the fly wheel 1 by means of the bolts 14 are the drag members 15, having a brake-shoe portion 16. It will be noted that the drag member 15 overlies the clutch facing material so that when ever the flywheel is in motion the centrifugal force will cause the brake-shoe portion of the drag member to operate against the clutch facing material 12 and not against the driven disc 13.

This coupling provides a weak connection between the drive and driven members of the clutch when the main driving and driven members of the clutch are released in the normal way and consequently allows the car operator with the accelerator to control the speed of the driven shaft and the drive gears in the transmission to facilitate shifting of the gears. It eliminates the necessity for double clutching action that is sometimes used for this purpose.

What I claim is:

1. In a clutch for an automotive vehicle, the combination of a driving member, a driven disc member provided with clutch facing material for taking the usual driving load, swingable means centrifugally operated acting on the facing material for effecting a weak coupling action between the two members, when the main driving connections on the clutch are released.

2. In a clutch for an automotive vehicle, the combination of a driving member, a driven member provided with clutch facing material for taking the usual driving load, centrifugal means pivotally mounted on the driving member which act on the facing material of the driven member to effect a drag coupling relation between the driving and driven members, when the main power connections in the clutch are released.

3. In a clutch for an automotive vehicle, the combination of a driving member, a driven disc provided with clutch facing material for taking the usual driving load, said facing material extending beyond the periphery of the driven disc, a centrifugally operated drag coupling member pivotally mounted on the driving member, said drag member frictionally engaging the periphery of the facing material of the driven member whereby the drag relation between the driving and driven members is effected whenever the driving member is rotated.

4. In a clutch, the combination of a driving member, a driven member provided with clutch facing material extending beyond the periphery of the web portion of the driven member, the diameter of said driving member being greater than that of said driven member, means pivotally mounted on said driving member, said means engaging the periphery of said facing material and frictionally engaging said facing material to effect a drag coupling relation between the driving and driven members.

5. In a clutch the combination of a driving member and a driven member, facing material for one of said members extending beyond the periphery of the web portion of said member, and means pivotally mounted on the other of said members for engaging the periphery of the said facing material to effect a frictional drag coupling relation between the said driving and driven members.

6. In a clutch, the combination of a driving member, a driven member, facing material on one of said members for frictionally engaging the other, said facing material extending beyond the edge of said member, and a drag device mounted upon one of the clutch members and arranged to frictionally engage the projecting edge of the facing material to effect a frictional drag relation between the said driving and driven members.

7. In a clutch, the combination of a driving member, a driven member, clutch facing material on the driven member adapted to frictionally engage the driving member, said friction material extending beyond the peripheral edge of the driven member, and movable means mounted on the driving member for frictionally engaging the projecting edge of the said material to effect a frictional drag relation between the driving and driven members.

In testimony whereof I have affixed my signature.

ERNEST E. WEMP.